Aug. 17, 1948.  A. E. BAAK  2,447,388
CONTROL SYSTEM AND APPARATUS
Filed April 10, 1944  2 Sheets-Sheet 1
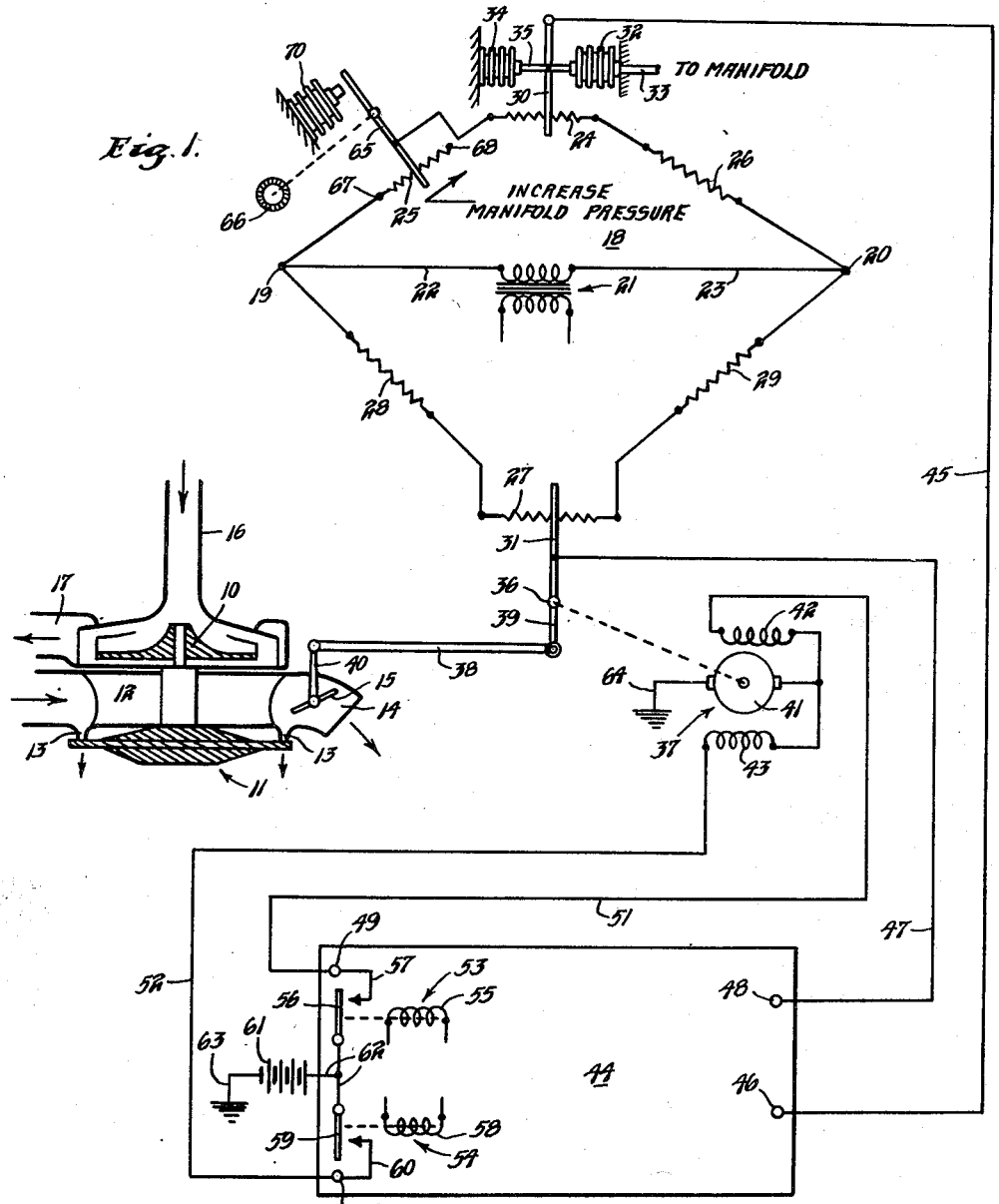
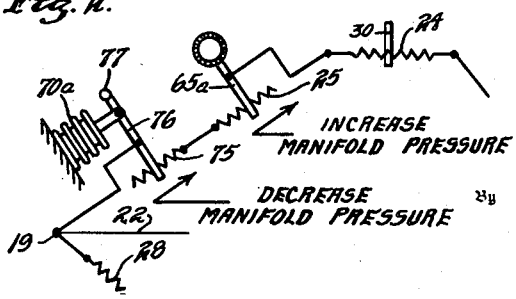
Inventor
ALBERT E. BAAK
By George H. Fisher
Attorney Aug. 17, 1948.                A. E. BAAK                    2,447,388
                        CONTROL SYSTEM AND APPARATUS
Filed April 10, 1944                                 2 Sheets-Sheet 2
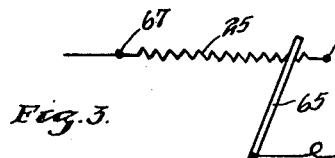
Fig. 3.
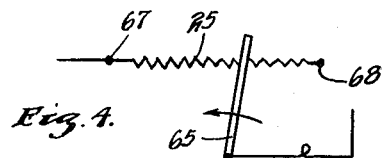
Fig. 4.
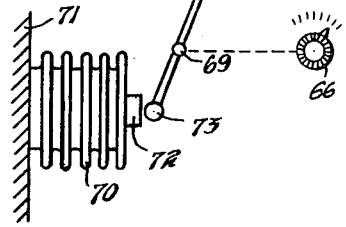
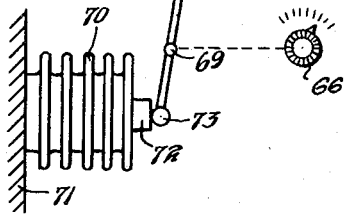
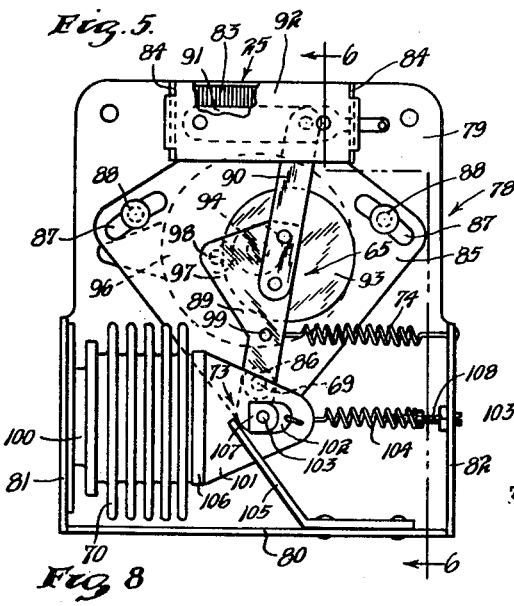
Fig. 5.
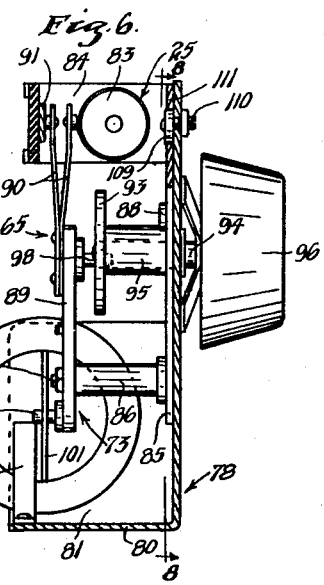
Fig. 6.
Fig. 8
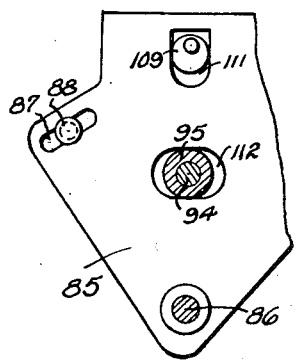
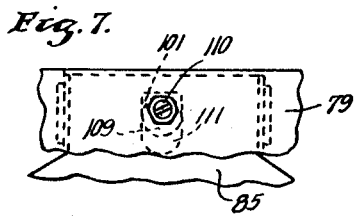
Fig. 7.
Inventor
ALBERT E. BAAK
George H. Fisher
Attorney Patented Aug. 17, 1948

2,447,388

UNITED STATES PATENT OFFICE 2,447,388

CONTROL SYSTEM AND APPARATUS

Albert E. Baak, Los Angeles, Calif., assignor to Minneapolis-Honeywell Regulator Company, Minneapolis, Minn., a corporation of Delaware Application April 10, 1944, Serial No. 530,422

13 Claims. (Cl. 230—5)

This invention relates to improvements in a control system and apparatus for selecting and controlling the intake manifold pressure of aircraft engines.

The air pressure in the intake manifold of the usual internal combustion engine used in aircraft must be controlled and adjusted accurately to selected values, in order to maintain engine performance during the frequently and widely varying conditions met with in flight. Such pressures must also be high, relative to that of the atmosphere, in order to support combustion of the fuel at high altitudes, and for this purpose it is customary to provide the engine with an air compressor, commonly called a supercharger, which takes the air from the atmosphere and, after raising its pressure by centrifugal compression, delivers it to the induction or intake manifold system of the engine. This supercharger is usually driven by a turbine which is actuated by the exhaust gases of the engine, in order to utilize the otherwise lost power thereof.

In order to control the air pressure in the induction or manifold system of the engine, the compression ratio of the supercharger compressor is varied, by means of a waste gate which, when opened, permits the exhaust gases to discharge without much effect on the turbine and which, as it closes, causes the gases to impinge in increasing degree on the turbine to thus increase the speed of the turbine and supercharger and increase the pressure of the air delivered by the latter. More or less continuous adjustment of the waste gate is required in order to maintain a selected manifold pressure and compensate for variations in the atmospheric air pressure as the plane ascends and descends. In addition, means must be provided for manually selecting the required or desired manifold pressures and it is in connection with such manual selecting means that my present invention is concerned.

For positioning the waste gate a reversible motor means is employed and the same is controlled by an electronic amplifier which has the property of controlling the direction and duration of the rotation of the waste gate positioning motor means in response to unbalance in an alternating current bridge circuit, a part of which is comprised by a variable resistance and the value of which resistance reflects the absolute pressure in the intake manifold of the engine. As this pressure rises or falls above a value at which the bridge is balanced, the resistance introduces unbalance in the bridge, energizing the amplifier in the proper manner to position the waste gate and return the pressure to the selected value.

Also included in the bridge circuit controlling the amplifier is a resistance which is manually adjusted to vary the balance point of the bridge and so influence the amplifier to set the waste gate at any selected position, and establish a desired manifold pressure.

The primary object of my invention is to provide a control system by means of which the desired intake manifold pressures may be manually selected but which includes means responsive to atmospheric pressure and operative to automatically compensate the control system for altitude in such manner as to limit the manifold pressure called for by the system at the higher altitudes. The need for this automatic altitude control of the manifold pressure arises from the fact that the turbine and supercharger have a maximum speed, above which their operation would cause damage, or breakdown, and since the need for higher manifold pressures increases as the altitude increases, due to the rarity of the atmosphere at the higher altitudes, it is obvious that the tendency toward overspeeding will usually occur when the manual control is set for the selection of the higher, or highest, permissible manifold pressure.

My invention also provides, and has as a further object the provision of, a novel and effective means for automatically retarding the setting of the manual selector control whenever the setting is such that for the altitude at which the plane is flying the turbine and supercharger will tend to exceed their top permissible speed.

These and other more detailed and specific objects will be disclosed in the course of the following specification, reference being had to the accompanying drawings, in which Figure 1 is a diagrammatical view of a control system embodying a network or bridge, motor and amplifier, and a turbine driven supercharger, and illustrating one embodiment of my automatic, altitude compensated system for controlling manifold pressure and turbine speed.

Figure 2 is a fragmentary diagrammatical view of a portion of the bridge circuit, showing a modified arrangement of the altitude compensating control.

Figure 3 is a diagrammatical showing of a modified manual selector apparatus embodying my invention, with the selector wiper or slider arm advanced to near its uppermost limits, or in a position for selecting the highest manifold pressure.

Figure 4 is a similar view but showing the wiper retarded by the expansion of an evacuated bellows engaging the wiper arm, this being the condition when the aircraft has risen above a predetermined critical altitude whereat the overspeeding of the turbine and supercharger would be likely.

Figure 5 is a rear elevation of one practical mechanical and electrical embodiment of the manual control of my invention.

Figure 6 is a cross sectional view taken along the line 6—6 in Figure 5.

Figure 7 is a fragmentary frontal elevation showing the adjusting cam means for initially setting up the control.

Figure 8 is a fragmentary cross-sectional view taken along the line 8—8 of Figure 6.

Referring to Figures 1 and 2 of the drawing, I have shown therein a manifold pressure control system embodying a centrifugal compressor or supercharger 10 driven by a turbine 11 arranged for operation by exhaust gases from the engine (not shown) which enter a nozzle box 12 having nozzles 13 for directing the gases against the turbine wheel. The nozzle box 12 has an outlet 14 in which is located a valve or waste gate 15. When this waste gate 15 is opened the exhaust gases are discharged to atmosphere with little effect on the turbine but as the waste gate is progressively closed the gases are caused to impinge the turbine wheel with greater effect causing the turbine to run at increasing speeds. The supercharger compressor 10 receives air at atmospheric pressure at the intake 16 and delivers it under compression to the intake manifold (not shown) of the engine through the outlet 17, and the compression ratio of the compressor is a direct function of the speed at which it rotates. It is thus readily apparent that the positioning of the waste gate 15 directly controls the pressure at the intake manifold of the engine.

The waste gate is positioned according to requirements by an electronic control system which is essentially like that disclosed in the copending application of Hubert T. Sparrow, Serial No. 474,378, filed February 1, 1943, for Control apparatus, to which attention is invited for a detailed disclosure of the system.

As herein shown the control system embodies a bridge circuit or network 18 made up of two parallel arms or branches connected across supply terminals 19 and 20, through which the bridge is supplied with an alternating potential by any suitable supply source, such as a transformer 21 having its secondary winding connected to said terminals 19 and 20 by conductors 22 and 23 respectively. One arm of the bridge circuit 18 includes a potentiometer type resistance 24 connected at its ends to the terminals 19 and 20 through a variable resistance, or impedance, 25 and a fixed resistance 26, respectively. The other arm of the bridge similarly includes a potentiometer resistance 27 connected at its ends to terminals 19 and 20, through fixed resistances 28 and 29, respectively.

A slider 30 is arranged to traverse the resistance 24 and make variable contact therewith, and a slider 31 is arranged to traverse resistance 27 for a similar purpose. The slider 30 is positioned by bellows 32 which is connected by a tubular line 33 to a suitable point on the intake manifold of the engine so that the expansion or contraction of this bellows will directly reflect the change in manifold pressures. Another bellows 34 (which is evacuated) is arranged in opposition to bellows 32 and the two are connected by a link 35 which also is connected to the slider 30, this arrangement compensating this control mechanism for atmospheric pressure changes in a well known manner so that the adjustment of the slider 30 across the resistance 24 will be an indication of the absolute pressure in the intake manifold.

The slider 31 may be carried by a shaft 36 and is swung thereby back and forth along the resistance 27 by a reversible electric motor 37 connected as shown to the shaft. A link 38 is also connected between an extension 39 of the slider 31 and an operating crank 40 on the waste gate 15, it being thus evident that the rotation of the motor 37 in opposite directions will oppositely position both the slider 31 and the waste gate 15. The motor 37 is here shown for convenience sake as being of a direct current reversible type having an armature 41 and two field windings 42 and 43, the selective energization of which will cause opposite rotation of the motor. Obviously, however, an alternating current motor may be employed if suitable control is provided.

The sliders 30 and 31 represent output points for the bridge circuit 18 and to these points the input terminals of an electronic amplifier 44 are connected, a conductor 45 connecting amplifier input terminal 46 to slider 30 while a conductor 47 similarly connects input terminal 48 to the slider 31. The amplifier 44 further includes output terminals 49 and 50 which are connected, respectively, by conductors 51 and 52 to the field windings 42 and 43 of the motor 37. Relays 53 and 54 also form a part of, or are controlled by, the amplifier 44 and the relay 53 includes a winding 55 which, when properly energized, attracts a movable contact 56 causing the same to make connection with a fixed contact 57 connected to terminal 49. The relay 54 similarly includes a winding 58 for attracting a movable contact 59 and making connection to a fixed contact 60 connected to terminal 50 when the winding is energized. Both movable contacts 56 and 59 are, of course, biased to normally stand away from the respective fixed contacts 57 and 60, when the windings are not energized.

The movable contacts 56 and 59 are connected together and to one terminal of a battery 61, or other source of current for the motor 37, by means of conductors 62, and the other terminal of the battery is shown as grounded at 63. The field windings 42 and 43 of the motor 37 are connected at one end to the conductors 51 and 52 and at their other ends are connected together and grounded through the armature 41 as represented at 64.

When the relay 53 is energized a circuit may be traced from one terminal of the battery 61 through the conductors 62, movable contact 56, fixed contact 57, terminal 49, conductor 51, motor field winding 42 and through the armature 41 and grounds 64 and 63 to the other terminal of the battery. This circuit thus energizes the field winding 42 causing the motor 37 to rotate in one direction. When the relay 54 is energized a circuit may be traced from one terminal of the battery 61 through conductors 62, movable contact 59, fixed contact 60, terminal 50, conductor 52, motor field winding 43 and through the armature 41 back to the battery through the grounds 64 and 63, this circuit energizing field winding 43 and causing the motor to rotate in the opposite direction.

The amplifier 44 selectively energizes the relays 53 and 54 in response to input signals applied to the input terminals 46 and 48, energizing the relay 53 if this signal is of a certain phase relation, and energizing relay 54 if the signal is of opposite phase. It is thus seen that the phase angle of the input signal at the amplifier directly controls the direction in which the motor 37 is rotated.

The signal for actuating the amplifier 44 is obtained from the bridge circuit 18 which is, as stated supplied with an alternating potential by the transformer 21. It is thus seen that the sliders 30 and 31, by adjustment along their respective resistances 24 and 27, will provide a signal potential when the bridge is unbalanced and that the phase angle of this signal potential will vary through one-hundred and eighty electrical degrees in accordance with the direction in which the bridge is unbalanced. That is, when one of the sliders is moved in one direction the bridge unbalance will supply a signal of one phase angle, while opposite movement of the slider will provide a signal of opposite angle. Of course, the the bridge will supply no signal when the sliders are so adjusted that they are of the same relative potential with respect to the input terminals 19 and 20 of the bridge.

Ignoring the variable resistance 25 for the time being, the operation of the control system will be briefly described. Assuming the bridge to be balanced, with the slider 31 at a certain position along its resistance 27, it is obvious that the waste gate 15 will be so positioned as to cause turbine and supercharger rotation at a speed such as to supply a certain value of intake manifold pressure. This pressure is reflected by the bellows 32 in a position of the slider 30 on the resistance 24 at which the bridge is balanced, and no signal then exists across the input terminals 46 and 48 of the amplifier 44.

Now should the intake manifold pressure decrease, the decreasing pressure in the bellows 32 may cause the slider 30 to move toward the right along resistance 24 whereupon a difference of potential will occur causing a signal to be applied to the amplifier 44. Assuming that relay 53 is now energized the motor 37 will rotate to adjust the slider 31 also toward the left along the resistance 27 to a point at which the bridge circuit is again balanced, whereupon the motor will stop. Meanwhile, however, the rotation of the motor 37 will have closed the waste gate 15 slightly, increasing the turbine and supercharger speed and building up the intake manifold pressure again. The operation is reversed if the intake manifold pressure increases, the signal due to the resulting unbalance in the bridge being then of opposite phase, causing relay 54 to be energized and the motor to run in the opposite direction to slightly open the waste gate before the bridge is again brought back to a balanced condition.

The variable resistance 25 serves as a manual selector for selecting the desired value of intake manifold pressure to be maintained by the control system. A wiper or slider 65 is arranged to traverse this resistance and the wiper is connected to one end of the resistance 24 while the resistance 25 is connected to the input terminal 19 of the bridge, it being thus clear that the adjustment of the wiper 65 in one direction will insert more resistance in the circuit while opposite adjustment will decrease the value of resistance in the circuit. A control knob 66 is provided for adjusting the wiper 65 and is, of course, located convenient to hand of the pilot of the aircraft to which the control system is applied.

Adjustment of the wiper or slider 65 to add resistance to the circuit will be readily seen to have the same effect on the balance conditions in the bridge circuit as movement of the slider 30 to the right along the resistance 24. That is, such adjustment will call for an increase in manifold pressure, causing relay 53 to be energized and the motor 37 to run in such direction as to slightly close the waste gate 15, while adjusting the slider 31 to rebalance the bridge. Opposite adjustment of the wiper or slider 65 to decrease the value of resistance in the circuit will have the opposite effect, calling for a lower manifold pressure.

Thus far the system and its operation are essentially identical to the copending application hereinbefore referred to, and no invention is herein claimed for such features. In accordance with my invention I provide means for compensating the system for altitude or atmospheric pressure changes as will now be described.

Referring now more particularly to Figures 3 and 4 of the drawing, I have shown therein in diagrammatical form one system for so compensating the control. The resistance 25 is the one previously described as connected in the bridge circuit 13 controlling the amplifier 44 and is arranged in such manner that movement of the wiper or slider 65 by the knob 66 along the resistance toward the right, or from terminal 67 toward the end 68, will so actuate and control the amplifier as to close the waste gate 15 and cause the turbine 11 and supercharger 10 to operate at faster speeds, as have been previously described. The operator, or pilot, thus will move the slider 65 toward the right to select higher intake manifold pressures, and will move the slider to the left to reduce the pressure, the slider oscillating about a pivot 69 in the process.

In accordance with my invention I provide an evacuated, conventionally spring loaded bellows 70 supported at one end on a rigid support 71 and arranged at its other, operating end 72 to move toward, or away from, an extended end 73 of the wiper 65 below the pivot 69. This bellows is so located that when it is contracted, or collapsed as seen in Figure 3, the operating end 72 will just clear the lower end 73 of the wiper 65 as the latter approaches its most advanced position along the resistance 25.

Now as the aircraft reaches a high altitude, for example 30,000 feet, the reduction in atmospheric pressure effective on the bellows 70 will cause an expansion thereof in such manner that its end 72 will move toward and engage the wiper end 73 and swing the wiper about its pivot 69 to oppositely swing its other end along the resistance 25 toward the left, as seen in Figure 4. The result will be a reduction in the manifold pressure called for by the control, as will be evident, and with the extent of such reduction dependent upon the altitude, since the distance to which the bellows 70 will expand is increased with increase in altitude.

As the aircraft then descends below the critical altitude the atmospheric pressure upon the bellows 70 will, of course, increase and the resulting contraction of the bellows will permit the return of the wiper 65 toward higher pressure, or more advanced settings. While in the complete manual device shown in Figures 5 and 6, spring means are provided for doing this automatically, in the schematic arrangement of Figures 3 and 4, this return of the wiper must be accomplished manually.

At any setting of the selector, the altitude pressure responsive bellows will automatically retard the setting when the altitude becomes such that the supercharger would have to overspeed to maintain the selected pressure. Thus, if the slider 65 were manually positioned in the position shown in Figure 4, the bellows 70 would have to respond considerably more before lowering the setting of slider 65 than when the slider 65 was at the maximum pressure setting as in Figure 3. This is desirable since even when it is not desired to maintain a pressure corresponding to the maximum pressure setting of the selector, the turbine will overspeed in an attempt to maintain such a pressure if the altitude becomes sufficiently high.

It is seen therefore that for any setting of the selector, the bellows 70 will automatically and progressively retard the selector setting as the aircraft ascends above the altitude at which it has been noted by experience that the turbine and supercharger have a tendency to overspeed if a manifold pressure of the valve selected is maintained. It will be understood further that such overspeeding tendencies occur in response to the increase in speed of the turbine called for by the drop in intake manifold pressure which appears above this altitude. This drop is, of course, due to the decreasing atmospheric pressures encountered, and as the manifold pressure falls, the bridge controlling the amplifier becomes unbalanced by operation of the slider 30 along resistance 24 which is responsive to the intake manifold pressure, and calls for an increase in turbine speed. The retardation of the setting of wiper 65 along the resistance 25 will overcome this unbalance of the bridge or cause an opposite counteracting influence tending to reduce the turbine speed, to thereby hold it to a safe value.

The bellows 70 is also shown as arranged in connection with the wiper 65 in Figure 1.

In its broadest aspects my invention is seen to provide a system including an altitude or atmospheric pressure responsive means for automatically controlling and limiting the manifold pressure, or turbine speed, and this may also be accomplished by a separate, altitude compensated resistance.

In such a system, shown in Figure 2, a resistance 75 is arranged between the previously described resistance 25, and the input terminal 19 of the bridge, or in such manner as to be in series with the resistance 25. A wiper 76 is provided to traverse the resistance 75, being pivoted for this purpose at 77, and a bellows 70a similar to the bellows 70 previously described is arranged to position the wiper 76 in accordance with changes in atmospheric pressure on the bellows. The resistance 25 is engaged by a wiper 65a, which in this species is controlled only manually. The arrangement is such that, as the atmospheric pressure decreases due to the ascent of the aircraft above a certain critical altitude, the resulting expansion of the bellows 70 will adjust the wiper 76 to decrease the amount of resistance 75 inserted in the circuit. This will have the same effect as a decrease in resistance 25 and will call for a reduced manifold pressure so that the turbine speed will be limited above such critical altitude. As the aircraft then descends the bellows will adjust the wiper 76 to restore the initial value of resistance in the circuit to thus increase the manifold pressure to the value called for by the manually adjusted resistance 25. In this form of the invention, however, the change in pressure upon change in altitude occurs regardless of the setting of the selector. This is not normally as desirable as is the operation obtained with the arrangement of Figures 1, 3 and 4.

Turning now to Figures 5 through 7, I have shown therein one practical mechanical and electrical exemplification of my invention embodying the mechanical retardation of the manual control as shown in Figures 1, 3 and 4. The resistance is again represented at 25, the wiper at 65, the pivot thereof at 69, the bellows at 70, and the lower end of the wiper which is engaged by the bellows at 73.

The control unit including these elements embodies a frame, designated generally at 78, having a front panel portion 79 from which is rearwardly bent a base flange 80 and two side flanges or wings 81 and 82. The resistance 25, shown as wound on a bobbin 83, is mounted between end members 84 which are secured to and rearwardly extended from an upper portion of a carrier member or mounting plate 85. This plate 85 is disposed behind the front panel 79 and at its lower end is pivoted about a stud 86 mounted on the panel 79, the stud 86 forming the pivot 69 for the wiper 65, so that the plate may be moved back and forth, that is, from side to side, behind the panel. The plate 85 has arcuate slots 87, centered about the axis of stud 86, at upper corner portions, and headed pins 88 are secured to the panel 79 and extended rearwardly through these slots in order to permit such lateral movements of the plate 85 while holding it against rearward displacement.

The wiper 65 comprises an arm 89 swingable about the pivot 69 and disposed by the stud 86 well to the rear of the mounting plate 85, and at its upper end this arm 89 carries the oppositely tensioned wiper or slider blades 90 one of which engages the rear side of the bobbin 83 and the other of which rides along a contact strip 91 secured to a subpanel 92 joining the end members 84 rearwardly of the bobbin. As the arm 89 is oscillated about its pivot 69 it is evident that one wiper blade 90 will traverse the resistor bobbin 83 as the other traverses the contact strip 91 thus making a variable contact with the resistance. This wiper, bobbin and contact strip assembly is well known in the art and should require no further description herein.

The arm 89 may be oscillated by a cam disk 93 which is eccentrically secured to the rear end of a knob shaft 94 journaled through a bushing 95 secured to the front panel 79. A knob 96 is secured to the forward end of the shaft 94 for turning the same. The arm 89 has a lateral extension or shoulder 97 upon the forward side of which is a cam follower pin 98 adapted to ride the peripheral surface of the cam disk 93. A spring 74 is stretched between a pin 99 on the arm 89 and the adjacent side flange 82 and tends to oscillate the arm toward the right, or clockwise, as viewed in Figure 5 so that the follower pin 98 will bear against the cam disk. It will be evident therefore that rotation of the knob 96 in one direction will so turn the cam disk 93 as to exert sidewise pressures on the follower pin 98 and cause the arm 89 to move to the left in Figure 5, causing the wiper blades 90 to approach the left end of the resistor bobbin 83. This will correspond to a setting of the knob 96 indicating the selection of lower manifold pressures. Opposite movement of the knob will then so rotate the cam disk 93 as to permit the arm 89 to move in the opposite direction under influence of the spring 74 and will cause the selection of higher manifold pressures.

Attention is directed to the fact that the cam arrangement is such that the arm 89 and wiper blades 90 may move toward the left, or toward setting corresponding to the selection of lower manifold pressures, independently of the manual adjusting means including the knob 96, knob shaft 94 and cam disk 93, such movement being, however, normally and yieldably prevented by the spring 74.

The bellows 70 is secured at one end at 100 to the side flange 81, which thus serves as the rigid support 71 referred to in Figures 3 and 4, while the opposite free or operating end of the bellows extends toward the wiper arm and carries a lug 101 slotted at 102 to receive a pin 103 on the lower end portion 73 of the wiper arm. A retractile coil spring 104 is stretched between the lug 101 and the other side flange 82 to prevent the collapsing of the bellows and a stop finger 105 is secured to the base flange 80 in position to engage the end cap 106 of the bellows when the same is expanded to the fullest extent.

In operation, as the wiper arm 89 reaches or approaches its most advanced position the pin 103 is near to or against the end 107 of the slot 102 in the lug 101 and therefore forms no obstruction to the normal operation of the control. That is, this condition maintains while the atmospheric pressure surrounding the bellows 70 is sufficient to hold it in its normal, partially collapsed position. Now as the atmospheric pressure decreases, due to the aircraft ascending to a high altitude, the bellows will expand, under influence of the spring 104, and the end 107 of the slot 102 engaging the pin 103 will swing the arm 89 about its pivot 69 in such manner as to retard the setting of the wiper blades 90, or move them away from their advanced setting, thus calling for a reduced manifold pressure, which will be accompanied by a reduction in turbine and compressor speed. As the altitude increases the bellows will gradually expand, progressively retarding the wiper setting and preventing the turbine and compressor from overspeeding, as will be evident. As the plane again descends the gradually increasing atmospheric pressure will cause the bellows to retract permitting the wiper setting to be automatically advanced again by the spring 74.

As was pointed out previously, this retarding of the setting of the selector will take place regardless of the pressure selected, if a sufficiently high altitude is reached. Thus, if a lower than maximum pressure is selected, the setting of the pressure selector will be decreased when an altitude is reached which is higher than that at which the altitude pressure responsive bellows 70 starts to reduce the pressure when the slider is at its maximum pressure setting.

The critical altitude above which automatic retardation of a given wiper setting takes place may be varied by adjusting the tension of the spring 104, by means of a conventionally arranged adjusting screw 108, which will have the effect of increasing or decreasing the amount of atmospheric pressure required to retract the bellows. In other words, an increase in the tension of the spring will decrease the altitude at which the bellows will expand and retard the wiper setting, and vice versa.

The mounting plate 85 by virtue of its swinging adjustment about the pivot center of the arm 89 permits the endwise adjustment of the resistor bobbin 83 with respect to the wiper blades 90, at any setting thereof. As a result the position of the wiper on the resistance at which the automatic altitude retardation will take place may be adjusted according to the operating characteristics of the system as a whole. In this manner, swinging the plate 85 to the right, in Figure 5, will reduce the manifold pressure selected by the knob 96 at which retardation will take place, and vice versa.

The mounting plate 85 may be thus adjusted by means of an eccentric 109 (Figures 6, 7 and 8) which is carried by a screw 110 in the upper center of the panel 79 and which plays in an opening 111 in the corresponding portion of the plate 85. The plate will, of course, be provided with an opening 112 to clear the bushing 95 during such adjustments, as best shown in Figure 8.

The bellows 70 as clearly shown acts with such leverage upon the wiper arm 89 that a comparatively small movement of the bellows will result in a larger range of movement of the wiper with respect to the resistance, such as will be required to provide an adequate range of control.

It is understood that suitable modifications may be made in the structure as disclosed, provided such modifications come within the spirit and scope of the appended claims. Having therefore fully illustrated and described my invention, what I claim to be new and desire to protect by Letters Patent is:

1. A control system for controlling the intake manifold pressure of an aircraft engine, comprising in combination, means including a variable impedance device operative to cause a reduction in intake manifold pressure when adjusted in one direction and to cause an increase in intake manifold pressure when adjusted in another direction, and means responsive to atmospheric pressure for operating said variable impedance device to adjust the same in a direction calling for a reduction in intake manifold pressure when the atmospheric pressure falls below a certain value with respect to the setting of the impedance device.

2. In a control system for controlling the intake manifold pressure of an aircraft engine, the combination comprising means including a manually variable element for selecting the intake manifold pressure, and means directly responsive to variations in atmospheric pressure for automatically controlling said manually variable element to reduce the intake manifold pressure called for thereby as the atmospheric pressure falls below a predetermined minimum.

3. A system for controlling the intake manifold pressure in an aircraft engine, comprising in combination, a control means including a variable impedance element the variation of which is operative to control the intake manifold pressure, and barometric means responsive solely to atmospheric pressure for varying said impedance element to automatically reduce the intake manifold pressure called for by the system only when the aircraft ascends above a predetermined altitude.

4. A system for controlling the intake manifold pressure of an aircraft engine, comprising in combination, a control means including an electrical network embodying a variable resistance operative to bring about an increase or decrease in intake manifold pressure in response to opposite variations in said resistance, and means responsive to ambient atmospheric pressures for varying said resistance to reduce the intake manifold pressure called for by the control system when the atmospheric pressure falls below a predetermined minimum.

5. A system for controlling the intake manifold pressure of an aircraft engine, comprising in combination, a control system including an electrical network embodying a variable resistance operative to bring about an increase or decrease in intake manifold pressure in response to opposite variations in said resistance, and means responsive to ambient atmospheric pressure for varying said resistance to progressively reduce the intake manifold pressure called for by the control system as the atmospheric pressure drops due to ascent of the aircraft above a preselected altitude.

6. In a control system of the character described for controlling the intake manifold pressure of an aircraft engine, an electrical bridge circuit having parallel branches and operative in response to variations in the impedance of one branch to oppositely adjust the intake manifold pressure between high and low values, and means responsive to variations in atmospheric pressure as the aircraft ascends and descends for varying the impedance in the said one branch of the bridge circuit to call for a reduction in the intake manifold pressure when the aircraft ascends above a preselected altitude.

7. Control apparatus for selecting manifold pressures in an aircraft engine, comprising in combination, a manually movable member adapted to be adjusted from a position for selecting a low value of manifold pressure toward an advanced position for selecting a high value of such pressure, and means directly responsive to atmospheric pressure and operative in response to a decrease in atmospheric pressure below a predetermined minimum for the selected manifold pressure as the aircraft ascends above a predetermined altitude for retarding the said movable member from its advanced position.

8. Control apparatus for selecting manifold pressures in an aircraft engine, comprising in combination, a manually movable member adapted to be adjusted from a position for selecting a low value of manifold pressure toward an advanced position for selecting a high value of such pressure, and means directly responsive to atmospheric pressure and responsive to a decrease in atmospheric pressure for operatively actuating the said movable member when it is in an advanced position and automatically adjusting the member toward a position for selecting a lower value of manifold pressure.

9. Control apparatus for selecting manifold pressures in an aircraft engine, comprising in combination, a manually movable member adapted to be adjusted from a position for selecting a low value of manifold pressure toward an advanced position for selecting a high value of such pressure, and means directly responsive to atmospheric pressure changes for acting upon the said movable member and progressively retarding it from said advanced position as the atmospheric pressure falls below a preselected minimum.

10. Control apparatus for selecting manifold pressures in an aircraft engine, comprising in combination, a swingably mounted member operative in response to movement in opposite directions to select higher and lower values of manifold pressures, means for manually moving said lever, and means directly responsive to atmospheric pressure and operative in response to a decrease in atmospheric pressure below a predetermined value to engage said member when it is in a position for selecting a high manifold pressure and swing the member independently of said manual means toward a position for selecting a lower manifold pressure.

11. Control apparatus for selecting manifold pressures in an aircraft engine, comprising in combination, a swingably mounted member operative in response to movement in opposite directions to select higher and lower values of manifold pressures, means directly responsive to atmospheric pressure and operative in response to a decrease in atmospheric pressure below a predetermined value to engage said member whenever it is in a position for selecting a higher manifold pressure and swing the member toward a position for selecting a lower manifold pressure, and means for adjusting the position of the said swingable member at which said atmospheric pressure responsive means will engage the member.

12. An apparatus for controlling the compressibility of an aircraft engine supercharger, comprising in combination, controlling means including motor means for variably adjusting the compressibility of the supercharger, a movable selector having manual means for positioning the same, supercharged pressure responsive means, means connecting said manual selector to said controlling means so that said selector upon movement thereof variably selects the pressure to be maintained by the supercharger, means connecting said pressure responsive means to said controlling means to variably adjust said controlling means and maintain the pressure selected by said movable selector means, and barometric means responsive solely to atmospheric pressure acting directly on said movable selector to modify the position of said selector in accordance with variations in atmospheric pressure.

13. An apparatus for controlling the speed of an aircraft engine supercharger whose supercharged pressure is a function of the speed of said supercharger, comprising in combination, speed control means including motor means for variably positioning a speed controlling device of the supercharger, a movable selector having manual means for positioning the same, supercharged pressure responsive means, means connecting said movable selector to said control means so that said selector variably selects the pressure to be maintained by the supercharger, means connecting said pressure responsive means to said speed control means to variably adjust said control means and maintain the pressure selected by said manual control means, and barometric means responsive solely to atmospheric pressure acting directly on said movable selector to modify the position of said selector in accordance with variations in atmospheric pressure.

ALBERT E. BAAK.

REFERENCES CITED

The following references are of record in the file of this patent:

UNITED STATES PATENTS

| Number | Name | Date |
|---|---|---|
| 1,346,563 | Sherbondy | July 13, 1920 |
| 1,375,931 | Rateau | Apr. 26, 1921 |
| 1,428,924 | Thomas | Sept. 12, 1922 |
| 1,508,707 | Moss | Sept. 16, 1924 |
| 1,508,731 | Standerwick | Sept. 16, 1924 |
| 1,557,793 | Berger | Oct. 20, 1925 |
| 1,816,787 | Moss | July 28, 1931 |
| 2,023,365 | Harding | Dec. 3, 1935 |
| 2,242,374 | Schultz et al. | May 20, 1941 |
| 2,376,142 | Hoffman et al. | May 15, 1945 |
| 2,376,143 | Edwards et al. | May 15, 1945 |
| 2,376,199 | Shoults | May 15, 1945 |

FOREIGN PATENTS

| Number | Country | Date |
|---|---|---|
| 479,278 | Great Britain | Jan. 28, 1938 |